United States Patent [11] 3,594,025

| [72] | Inventor | Adolph A. Wagner<br>3454 N. Shepard Ave., Milwaukee, Wis. 53211 |
|---|---|---|
| [21] | Appl. No. | 774,961 |
| [22] | Filed | Nov. 12, 1968 |
| [45] | Patented | July 20, 1971 |

[54] PIPE RAILING FITTING
5 Claims, 8 Drawing Figs.

[52] U.S. Cl. ................................................ 287/54, 285/189
[51] Int. Cl. ................................................ F16b 7/00
[50] Field of Search ........................................ 285/155, 156, 189, 286; 287/54 C, 54 A, 54 B; 256/65

[56] References Cited
UNITED STATES PATENTS

| 1,966,403 | 7/1934 | Durham | 285/286 |
| 1,840,048 | 1/1932 | Michelman | 287/54 C |
| 2,126,519 | 8/1938 | Vogel | 285/286 |
| 2,481,885 | 9/1949 | Simpson | 287/54 C X |
| 2,848,258 | 8/1958 | Mudd | 287/54 C |
| 3,176,987 | 4/1965 | Johnston | 287/2 X |
| 3,062,567 | 11/1962 | De Witt | 285/156 X |

FOREIGN PATENTS

| 215,903 | 11/1941 | Switzerland | 287/54 C |
| 1,213,997 | 11/1959 | France | 285/189 |

Primary Examiner—Reinaldo P. Machado
Assistant Examiner—Andrew V. Kundrat
Attorneys—John W. Michael, Gerrit D. Foster, Bayard H. Michael, Paul R. Puerner, Joseph A. Gemignani, Andrew O. Riteris and Spencer B. Michael ABSTRACT: A pipe railing fitting comprising an extruded collar portion and a connector cup portion. The extruded collar, common to all fittings, is dimensioned to fit tightly in the end of a standard sized pipe or post. The connection is permanently secured by welding the collar to the pipe or post.

the connector cups vary in configuration to permit one or more pipe railings to be welded to the posts. Essentially four types of connector cups are required in order to accomplish the various permutations arising in a typical pipe railing structure.

All of the connector cups are similar in that they are "precoped" to permit a pipe or post member to fit snugly in the cup. The connection is permanently secured by welding the members together.

PATENTED JUL 20 1971

3,594,025

Inventor
Adolph A. Wagner
By Paul R. Puerner
Attorney

PIPE RAILING FITTING

BACKGROUND OF INVENTION

1. Field of Invention

This invention relates to pipe railing fittings and, more particularly, to "precoped" drive-on pipe-welding connectors.

2. Description of Prior Art

The conventional method for the fabrication of a pipe stair railing is to lay out the entire structure (usually in the shop) and then cutting or coping the various parts to provide the proper fit for welding. The procedure involves the use of special coping machines and dies in order to provide the proper fit between the various lengths of pipe and fittings employed in making the structure. Each job is customized to the extent that many of the parts must be cut or coped before welding.

The principal object of this invention is to provide a set of "precoped" fittings made in the form of stampings which constitute a basic set of building blocks for fabricating pipe railing structures without the need for any special cutting or coping of the parts before welding. Such "precoped" fittings facilitate on-the-job fabrication with a minumum of labor and further provide a finished structure having an improved appearance.

SUMMARY OF INVENTION

A pipe railing fitting comprising an extruded collar and connector cup is made of a flat stamping of metal material.

One embodiment of this invention common to all of the fittings is the extruded collar which is driven into the end of a pipe or post. The collar is tapered to facilitate a snug fitting and has a flange which seats on the end of the pipe or post and the connection is permanently secured by welding the flange to the pipe.

Each of the various fittings have connector cups which permit the various connections necessary in a pipe stair railing structure. All are similar in that they are coped to permit a snug fitting of a pipe or post into the connector cup which is then welded together.

One embodiment of this invention is a Type-A connector having a connector cup comprised of two connector lips shaped as a riding saddle to permit a snug cradling of a pipe or post. A weld along the lip edges permanently secures the connection.

Other fittings permit a plurality of pipes to be joined to a post perpendicular to each other in a plane normal to the post. Another fitting allows the connection of a beveled pipe to a post.

The principle advantage of the present invention is to eliminate the coping and cutting of the pipes themselves. Pipes may now be simply cut to established lengths and the connector fittings may be driven on and the structure assembled on the spot.

Other objects and advantages will be pointed out in or be apparent from, the description and claims, as will obvious modifications of the various embodiments shown in the drawings.

DESCRIPTION OF PREFERRED EMBODIMENTS

Figure 1:
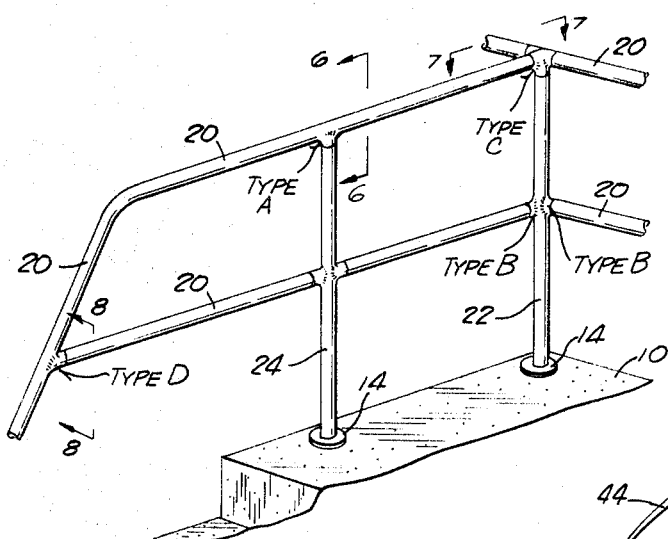
FIG. 1 is a fragmentary perspective view of a typical pipe stair railing.

Referring now to the drawings in detail, FIG. 1 shows a perspective view of a typical pipe stair railing structure 16 which embodies the several "precoped" fittings of this invention. The stair railing 16 is comprised of vertical corner and line posts 22 and 24 mounted in a concrete slab 10 by means of floor flanges 14 and a plurality of top and middle pipe rail members all of which are marked with the reference numeral 20.

FIGS. 2, 3, 4 and 5 are perspective views of four basic fittings which together form the basic building blocks for fabricating a typical pipe railing like that shown in FIG. 1. The four fittings are marked for purposes of illustration as Types A, B, C and D. The fittings are preferably fabricated in the form of a flat metal stamping which is then formed and extruded by a machine operation to provide the desired configuration.

Each fitting is comprised of two basic portions namely a collar portion 30 and a connector cup portion 40.

Collar portion 30 is comprised of a tapered neck 32 of tubular shape and a shoulder portion 34 which forms the joint between the neck 32 and the connector cup 40. Tapered neck 32 of collar 30 is dimensioned to fit snugly within the open end of a standard size pipe member (usually 1¼ inches or 1½ inches) as clearly shown in FIG. 8. The parts can be permanently fastened together by a weld 36 as shown.

Figure 2:
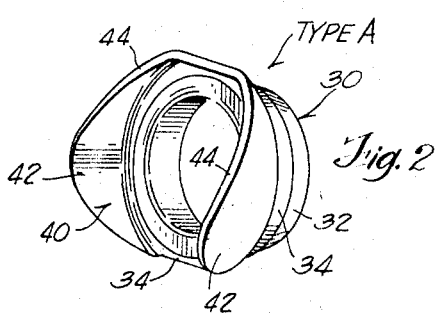
FIG. 2 is a perspective view of a Type-A fitting.
Figure 6:
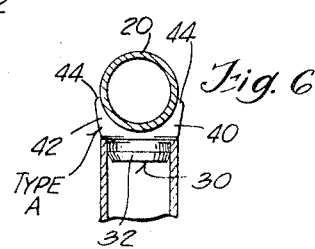
FIG. 6 is a fragmentary sectional view of a Type-A fitting connection taken on line 6—6 of FIG. 1.

One embodiment of the invention is a Type-A connector illustrated in FIGS. 1, 2 and 6. In addition to the above-described collar portion 30, Type-A is comprised of a connector cup 40 having two identically shaped connector lips 42 which together form a saddle adapted to fit snugly around a pipe rail 20 as illustrated in FIG. 6. The connection is permanently achieved by means of a weld along the connector lip edges 44.

FIG. 1 shows two possible uses of a Type-A connector. One is to weld a single top level pipe rail 20 to a line post 24 or a pair of middle level pipe rails 20 to opposite sides of a line post 24.

Figure 3:
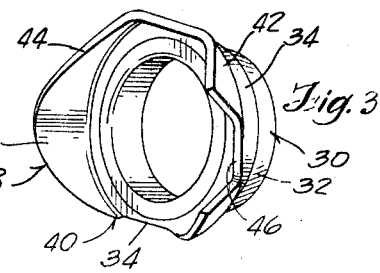
FIG. 3 is a perspective view of a Type-B fitting.
Figure 7:
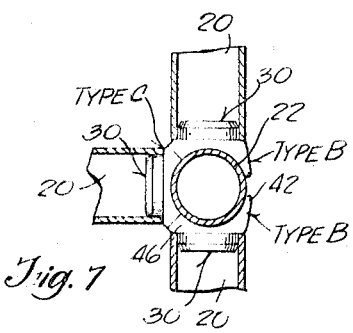
FIG. 7 is a fragmentary sectional view of a Type B and C fitting connection taken on line 7—7 of FIG. 1.

Referring now to the second embodiment (Type B) of the present invention shown in FIGS. 1, 3 and 7, the basic arrangement involved in this embodiment is the same as that previously described with respect to the Type-A embodiment shown in FIGS. 1, 2 and 6.

FIG. 3 shows a Type-B connector which is identical to Type A in every dimension except that one of the connector lips has its central portion cut out as indicated by reference numeral 46 to obviate interference with an adjacent fitting as clearly shown in FIG. 7. Similarly, the Type-C connector (FIG. 5) has both of its connector lips 42 cut out as indicated by reference numerals 46. FIG. 7 shows a typical arrangement wherein both Type B and C connectors are used. As shown in FIG. 7, where it desired to connect three pipe rails 20 to a post 22 at the same elevation, a pair of Type-B connectors together with a single Type-C connector are employed. It will be appreciated that if it were desired to connect four rails to the post, four Type-C connectors would be required.

Figure 4:
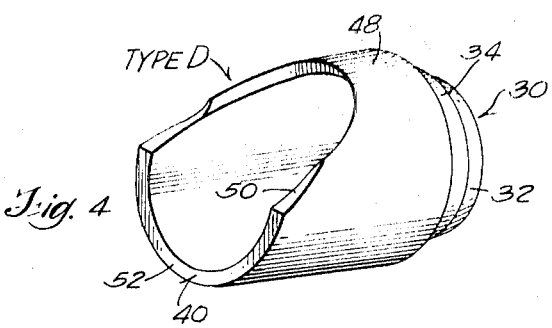
FIG. 4 is a perspective view of a Type-D fitting.
Figure 5:
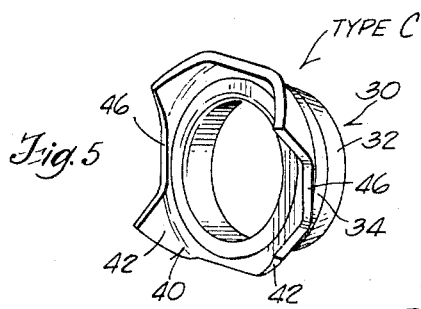
FIG. 5 is a perspective view of a Type-C fitting.
Figure 8:
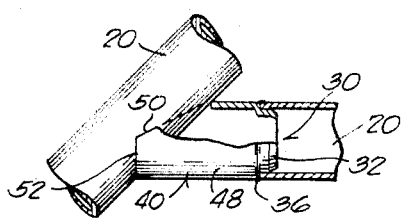
FIG. 8 is a fragmentary section cutout view of a Type-D fitting connection taken on line 8—8 of FIG. 1.

The fourth embodiment of the present invention is a Type-D connector as shown in FIGS. 1, 4 and 8. The Type-D connector is comprised of an extruded collar 30 as previously described and a connector cup 40.

the connector cup 40 is comprised of a tubular portion 48 which corresponds in size with the pipe railing 20. The tubular portion 48 is cut out or coped as at 50 as clearly shown in FIG. 4 to provide a beveled type connector for welding an angled pipe rail 20 as shown in FIG. 8. The pipe railing 16 fits snugly within this cutout as shown in FIG. 8 and the connector is permanently secured by welding along the edge 50. Type-D connectors can, of course, be beveled at any desired angle, however, angles of 36° and 45° will generally be suitable for most installations.

The Type-D connector thus allows a connection between horizontal rail and an angled rail as shown in FIGS. 1 and 8.

Such a connection is necessitated when a pipe railing structure extends up or down a stair or ramp.

The resulting coped, drive-on pipe welding connectors shown in FIGS. 1—8 allow on-the-site construction of a pipe stair railing without any special cutting or coping. The rails and posts are cut to established lengths and the entire assembly is done at the installation situs. The extruded collar 30 of each type connector is driven onto the end of a pipe or post and the mating pipe or post is fitted into each respective connector cup 40. After the structure is assembled each connection is permanently secured by welding.

Although but four embodiments of the present invention have been illustrated and described, it will be apparent to those skilled in the art that various changes and modifications may be made therein without departing from the spirit of the invention or from the scope of the appended claims.

I claim:

1. A pipe railing fitting comprising:
a collar portion having a tapered neck of tubular shape and a shoulder portion formed at one end of said tapered neck, said tapered neck adapted to fit snugly in the open end of a standard size pipe; and
a connector cup portion fastened to the outer most periphery of said shoulder portion, said connector cup portion shaped to fit snugly over the side of a pipe railing.

2. A pipe railing fitting according to claim 1 in which said connector cup portion is comprised of a pair of identically shaped connector lips which together form a saddle adapted to fit snugly around the side of a pipe rail, said connector lips including edges provided for welding said fitting to a pipe.

3. A pipe railing fitting according to claim 2 in which one of said connector lips has its central portion cut out to obviate interference with an adjacent fitting.

4. A pipe railing fitting according to claim 2 in which both of said connector lips have their central portions cut out to obviate interference with adjacent fittings.

5. A pipe railing fitting according to claim 1 in which said connector cup portion is comprised of a tubular portion which is cut at an angle to fit snugly around the side of a pipe railing which extends at an angle with respect to the pipe in which the collar portion of the fitting is inserted, said cup portion including edges provided for welding said fitting to a pipe.